United States Patent [19]

Patterson

[11] 4,385,581
[45] May 31, 1983

[54] DEVICE FOR TYING TO A POINT OF SUPPORT

[76] Inventor: Howard F. Patterson, 1840½ W. High St., Springfield, Ohio 45504

[21] Appl. No.: 338,220

[22] Filed: Jan. 11, 1982

Related U.S. Application Data

[63] Continuation of Ser. No. 146,460, May 5, 1980, abandoned.

[51] Int. Cl.³ .................. B65H 75/26; F16G 11/04; D06F 53/04
[52] U.S. Cl. ...................................... 114/218; 24/130
[58] Field of Search .................. 114/218, 219, 221 R, 114/230, 293; 24/129 R, 129 A, 129 B, 129 D, 130; 248/493

[56] References Cited

U.S. PATENT DOCUMENTS

| | | | |
|---|---|---|---|
| 3,142,075 | 7/1964 | Hill | 441/73 |
| 3,622,100 | 11/1971 | Wright | 24/130 |
| 3,910,280 | 10/1975 | Talonn | 24/130 |
| 4,280,435 | 7/1981 | Loomis | 114/219 |

Primary Examiner—Charles E. Frankfort
Assistant Examiner—C. T. Bartz

[57] ABSTRACT

A slotted plate mountable on a wall or other point of support for tying a rope thereto. The rope is looped about the plate and through a slot so that it cannot slip free when tension is applied.

1 Claim, 4 Drawing Figures

DEVICE FOR TYING TO A POINT OF SUPPORT

This application is a continuation of application Ser. No. 146,460, filed May 5, 1980, now abandoned.

BACKGROUND OF THE INVENTION

This invention relates to fastening devices, generally. More particularly it relates to a device for tying or securing a rope or the like to a point of support.

Knots have aided sailors and challenged boy scouts for many years. And yet despite their variety and utility, knots are not always easy to use.

In putting up a clothes line, for example, it is common to stretch the line taut between two points of support and then tie some sort of knot at the supports to retain tautness. But often a certain unwanted slackness seems to creep in as one struggles to tie the knot.

And taking down the clothes line can be equally difficult, especially if the knot was overtightened or if it has become swollen and stubbornly resistent to untying.

Another problem is encountered when working with ropes of considerable length. Many, if not all, of the common knots are formed by passing one free end of a rope through a loop in the rope and drawing it tight. If the free end of the rope is lengthy, the passing through and drawing tight of the free end takes considerable time and effort.

SUMMARY OF THE INVENTION

The fastening device of this invention comprises a plate adapted for attachment to a point of support and having an elongated slot and a notch therein. A rope may be quickly and easily secured without any perceptible loss of tautness by looping it around the plate so the rope engages with the notch and its standing end inserted through the elongated slot. The free end of the rope is then drawn taut, wedged between the plate and the standing end of the rope, and inserted into the elongated slot next to the standing end already inserted.

The result is a rope fastening that remains taut while being tied; it will not slip when tension is applied to the rope's standing end; and it is easily and quickly untied.

Because the invention utilizes an elongated slot for insertion of the rope's free end, it is easy to secure a rope at any place along its length, regardless of the length of the rope.

For a further and more detailed understanding of this invention reference is made to the following description and the accompanying drawings.

DESCRIPTION OF THE PREFERRED EMBODIMENT OF THE INVENTION

Figure 1:
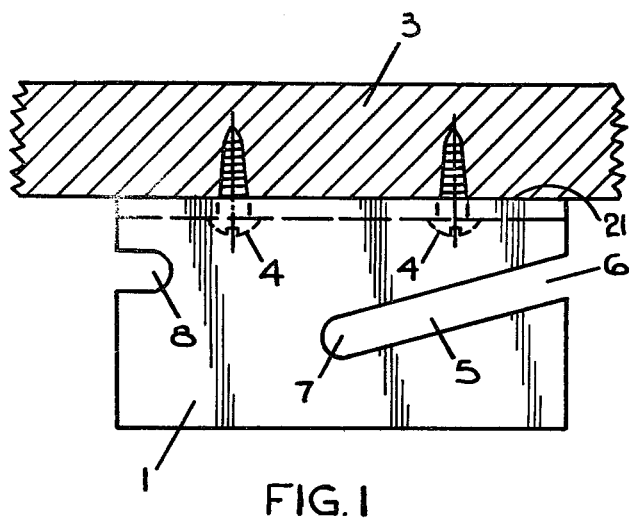
FIG. 1 is a top plan view of the anchor according to this invention.
Figure 2:
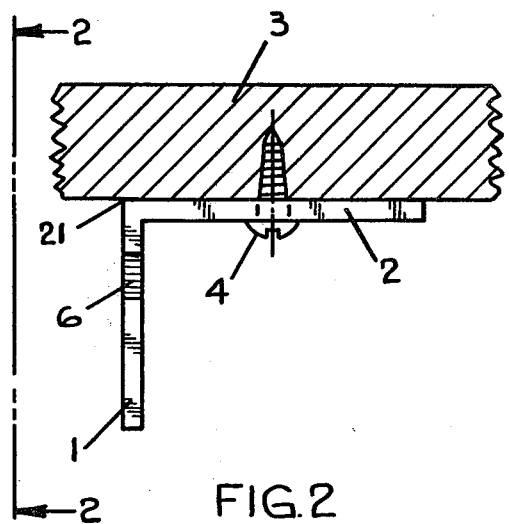
FIG. 2 is a side elevational view thereof taken along the line 2—2 of FIG. 1.

Referring to FIGS. 1 and 2 of the drawings, the preferred embodiment of the invention comprises a plate 1 having an angle-shaped bracket 2 which forms an edge 21 with plate 1. The angle-shaped bracket 2 is adapted for attachment to a point of support, such as a wall 3, by means of screws 4, or glue, or the equivalent.

The plate 1 has therein an elongated slot 5, having an open end 6 and a closed end 7; said slot 5 is situated in acute angular relation to edge 21 with its open end 6 being nearer edge 21 than its closed end 7.

In the presently preferred embodiment plate 1 has a serration or notch 8 situated on a line passing generally parallel to edge 21 and through open end 6 of slot 5.

Figure 3:
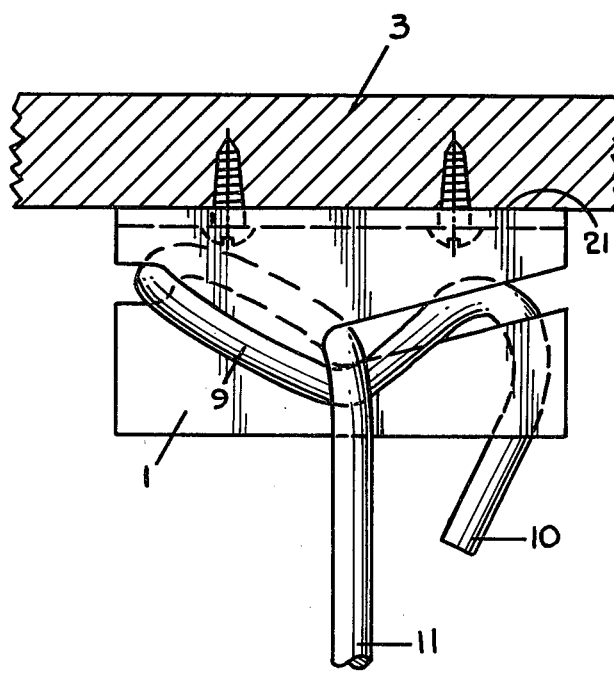
FIG. 3 is a top plan view of the anchor showing a rope attached thereto according to this invention.
Figure 4:
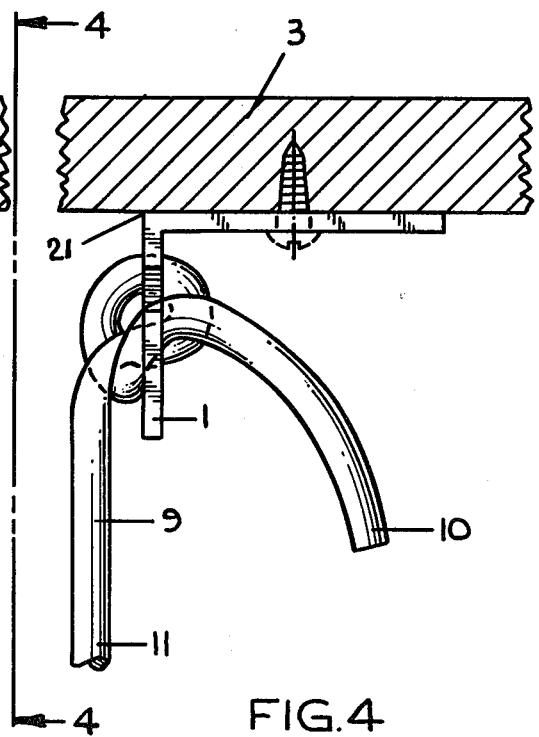
FIG. 4 is a side elevational view thereof taken along the line 4—4 of FIG. 3.

Referring to FIGS. 3 and 4, the invention is used in conjunction with a cable, line, or rope 9 having a free end portion 10 and a standing portion 11. The rope 9 may be removably secured or tied to the plate 1 as follows.

The rope 9 is looped about plate 1 so that its standing portion 11 passes through slot 5 and comes to rest in the closed end 7 of said slot. At this time, if desired, the standing portion can be made taut by pulling on the remaining free end portion. The free end portion 10 is then engaged with notch 8 and pulled under the standing portion 11 so as to become wedged between the standing portion 11 and plate 1. Finally the free end 10 is inserted in slot 5 and pulled next to the standing portion 11 already inserted.

As will be apparent, the invention thus described is useful for securing a line to any point of support, whether stationary or not, by modifying the shape and relation of the plate 1 and bracket 2 to suit the particular nature of the point of support. Thus the invention may be particularly useful to secure clothes lines, guy lines for tents, rigging on sailboats, or the like.

While a presently preferred embodiment of this invention has been illustrated and described in detail, it will be understood that modifications as to details of construction and design are possible without departing from the spirit of the invention or the scope of the following claims.

I claim:

1. A method of securing flexible means having first and second portions and having an intermediate portion therebetween to a plate having a first edge and coupled to a support structure, said plate having an elongated slotted opening with open and closed ends situated on a line forming an acute angle with said first edge, said plate further having a notch situated on a line passing generally parallel to said first edge, comprising the steps
   (a) looping said flexible means about said plate so said intermediate portion passes through said elongated slotted opening and comes to rest in said closed end,
   (b) engaging said first portion with said notch,
   (c) passing said first portion between said second portion and said plate,
   (d) passing said first portion through said elongated slotted opening, and
   (e) applying tension to said second portion in a manner such that said tension develops clamping pressure on said first portion, wedging said first portion between said second portion and said plate.

* * * * *